Figures 1, 2:
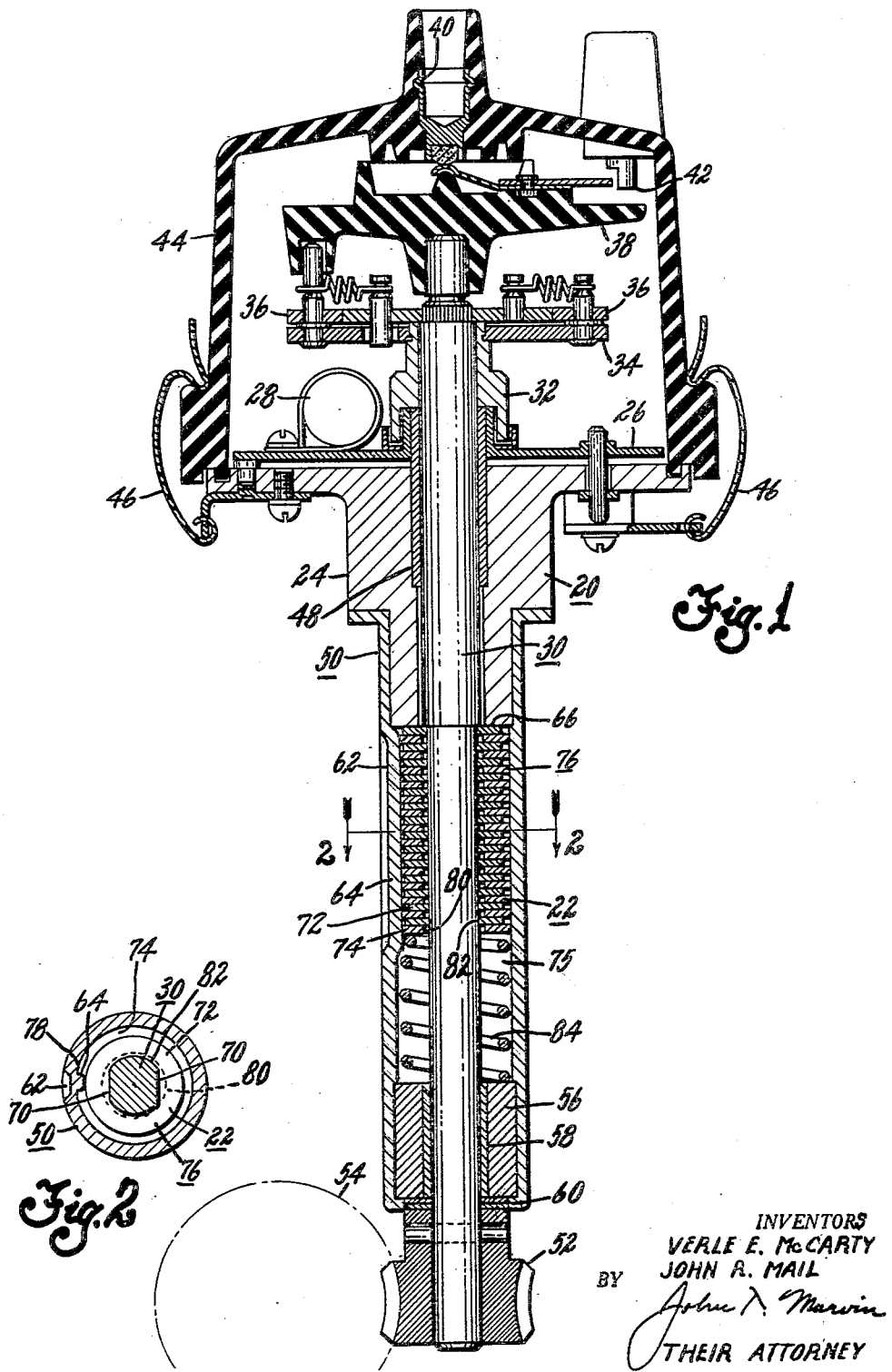

INVENTORS
VERLE E. McCARTY
JOHN R. MAIL
BY John X. Marvin
THEIR ATTORNEY

United States Patent Office 2,821,185
Patented Jan. 28, 1958

2,821,185

DISTRIBUTOR STRUCTURE

Verle E. McCarty, Markleville, and John R. Mail, Anderson, Ind., assignors to General Motors Corporation, Detroit, Mich., a corporation of Delaware Application January 16, 1956, Serial No. 559,190

5 Claims. (Cl. 123—148)

This invention relates to distributors for internal combustion engines and more particularly to a distributor wherein a frictional brake creates a frictional drag in opposition to the rotation of the distributor shaft.

As is well known, the present day conventional distributor for an internal combustion engine generally is provided with a shaft that has one end associated with elements including weight plates, weights and levers which cooperate to drive a cam to operate a circuit breaker and to distribute the necessary electrical energy at the proper instant to the ignitors or spark plugs so the charges within the engine cylinders may be properly ignited. These elements of the distributor are enclosed generally within a housing of such construction that permits ready attachment or removal from the engine. The housing generally is provided with a shank or sleeve that is concentric with the shaft and extends into a well or sump provided by the crankcase so the other end of the shaft, which extends beyond the shank or sleeve which has a gear connected thereto, may be driven by a gear within the crankcase which, in turn, is driven from the crankshaft of the engine. Further, when the distributor is mounted as indicated and is driven by the gears indicated, it has been noted that the power delivered to the distributor shaft is not constant as would otherwise be expected, but is undulating even during periods when the rotational speed of the crankshaft is substantially constant.

This is believed partly due to the inherent operation of the internal combustion engine which produces a series of torsional impacts upon the distributor shaft thus causing a whipping action of the shaft and backlash between the driving and driven gears to the distributor shaft. This backlash tends to cause what is known as "spark wander." This term is applied when the distributor mechanisms cause an erratic and improperly timed sparking to occur at the ignitors of the engine.

It is to the reduction of this spark wander that the present invention is directed. It is an object of the present invention to provide a frictional drag on the distributor shaft to minimize, if not eliminate, the effect of backlash between the driving gearing for this shaft.

A further object of the present invention is to include a plurality of discs of friction material within the shank of a distributor, which discs are arranged to provide a substantially constant frictional drag on the driving shaft which extends through the shank and which shaft is gear-driven and connected to rotate the various other components of the distributor.

Another object of the present invention is to reduce spark wander in a distributor by driving the shaft of the distributor against the force of a frictional brake which comprises a plurality of discs which are arranged to form a stack which is held under compression by a spring, so a constant frictional drag is exerted by the stack on the shaft.

A still further object of the present invention is to provide the sleeve of a distributor with an inwardly extending kink or notch and the shaft of the distributor within the sleeve with a flat portion, which kink forms a ridge on the internal surface of the sleeve so alternate discs of a stack of porous metal discs of friction material will be held stationary relative to the sleeve and the remainder of the discs of the stack will be held stationary relative to the shaft.

It is another object of the present invention to provide a sleeve in a distributor mount through which the distributor shaft extends with means for holding against rotation the alternate discs of a stack of porous metal discs of friction material and to provide means on the shaft for preventing relative rotation between the shaft and the remaining discs of said stack and to compress said stack with a spring so the face-to-face engagement between the discs is substantially constant whereby a drag of a substantially constant force against rotation is exerted on the shaft.

Further objects and advantages of the present invention will be apparent from the following description, reference being had to the accompanying drawings wherein preferred embodiments of the present invention are clearly shown.

In the drawings:

Figure 1 is a sectional view of a distributor wherein the device, according to the present invention, is included; and Figure 2 is a sectional view along line 2—2 in Figure 1.

In the drawings, the numeral 20 designates a distributor which includes the frictional drag means 22, according to the present invention. The distributor may be any of the well-known types suitably modified to include the present invention and may be of the type disclosed in application, S. N. 400,024, which application has been assigned by the inventors to the assignee of the present invention.

In this application, the construction and function of the various parts of the distributor are clearly set forth. These parts include a housing, or base, 24, a breaker plate assembly 26, a condenser 28, a shaft 30, a cam 32, a centrifugal advance mechanism 34 which has weights 36, a distributor rotor 38 which completes a circuit between a central electrode 40 and the radially located electrodes 42 which distribute the electrical impulses to the spark plugs, not shown. The electrodes 40 and 42 are carried by the cap 44 which, in turn, is held in position on the base 24 by clips 46. The shaft 30 is journalled on its upper end by a suitable sleeve bearing 48.

Suitably secured to the lower end of base 24 is a sleeve 50 which is coaxial and concentric to shaft 30. The sleeve 50 terminates short of the bottom end of the shaft 30 so a gear 52 may be secured to the bottom end of the shaft. The shaft 30 is rotated through gear 52 by gear 54 which is preferably driven by the cam shaft of the engine, not shown. The bottom end of the sleeve 50 is inwardly turned to support an annular block 56 that, in turn, supports a bearing 58 which journals the bottom end of shaft 30. Disposed between the gear 52 and the block 56 and surrounded by the turned-in edges of the sleeve 50 is a pair of wear-resistant annular discs 60 which surround shaft 30 and may be utilized to form a seal to prevent interchange of lubricants between the crankcase of the engine and the interior of the sleeve, if desired.

As clearly seen in the drawings, the exterior surface of sleeve 50 is inwardly crimped at 62 to form a longitudinally extending ridge 64 on the interior surface of the sleeve. The crimp 62 is so formed that the ridge 64 is axially aligned with and spaced from shaft 30. The end of base 24 to which the sleeve 50 is attached is formed to provide an annular surface 66 surrounding a bore through which shaft 30 extends. The portion of shaft 30 opposed to ridge 64 is provided with flat portions 70. The interior walls of sleeve 50, the annular surface 66 and the block 56 are arranged to form a chamber 75. The discs 72 and 74, which are alternately arranged to form the stack 76, have a diameter which permits the stack to be received within the chamber 75 interior of the sleeve 50. Each of the discs are of friction material and preferably of porous metal friction material which is well known to those skilled in the friction material arts and may be either of types which will function in either a wet or dry environment. That is to say, the material selected for the discs should be suitable for the particular application involved and, in the present invention, the discs are preferably of the wet type which will provide frictional surfaces in the presence of lubricating fluids such as engine crankcase oil and fluids or greases which are employed to provide lubrication for the bearings of the distributor. It is manifest that, if the discs are of the material that requires exclusion of fluids and other lubricants, then seals, not shown, must be provided to exclude the engine crankcase oil and the lubricants for the bearings of the distributor from the chamber within sleeve 50 wherein the discs are located.

The discs 72 and 74 are each annular in shape with the discs 74 having a larger diameter than discs 72. The discs 74 each have a notch or other means 78 which receive the ridge 64 to hold the discs 74 non-rotatable relative to sleeve 50. The inner annular opening 80 in the disc 74 is of a diameter to have clearance between the shaft 30 and the disc 74. The discs 72 each have an outer diameter smaller than the inner diameter of sleeve 50. The central opening 82 is shaped to embrace both the flat portions 70 and the rounded portions of shaft 30, as shown in Figure 2, so that discs 72 are non-rotatable relative to shaft 30.

The stack 22 of discs 72 and 74 is compressed by a spring 84. This spring 84 has one end resting on block 56 and the other end resting on the bottom disc 74, non-rotatable or stationary, of the stack 22 and is compressed so a substantially constant pressure is exerted to force the stack against the surface 66. When this arrangement is utilized, the contacting faces between the discs 72 and 74 will be urged together with a constant pressure to oppose relative movement between the discs. As clearly seen from the drawings, alternate discs 74 of the stack 22 are non-rotatable relative to the sleeve 50 and the remaining discs 72 of the stack 22 are non-rotatable relative to the shaft 30. Thus, the stack of discs will oppose the rotation of the shaft 30 with a substantially constant frictional drag when the shaft 30 moves discs 72 relative to the discs 74. This drag on shaft 30 will cause gear 52 to be held against backlash relative to gear 54 and will prevent transmission of the momentary undulations of rotation from the gear 54 to the parts of the distributor within cap 44.

While the embodiments of the present invention as herein disclosed constitute preferred forms, it is to be understood that other forms might be adopted.

What is claimed is as follows:

1. In combination with a distributor having a sleeve and a shaft within said sleeve adapted to be continuously rotated by a pair of gears, one of which is connected to the end of said shaft and the other of which is driven by an engine, a means for imparting a frictional drag on said shaft to maintain a tight driving connection between said gears comprising; a stack of discs axially movable within said sleeve having alternate disc members connected to said sleeve and said shaft, and a spring within said sleeve for compressing said stack to maintain a predetermined face to face engagement pressure between the discs of said stack.

2. In a distributor for an internal combustion engine, the combination comprising; a hub having an axial bore, a pair of bearings spaced on opposite ends of said bore, a shaft journalled within said bearings having ends extending beyond said bearings, a pair of meshing gears, one of which is secured to one of the projecting ends of said shaft and the other of which is continuously driven by the engine, a plurality of brake discs within said bore disposed between said bearings for maintaining said gears in tight driving engagement and a spring having one end resting on one of said bearings and another end resting on said discs for applying a predetermined pressure between said discs.

3. In a distributor for an internal combustion engine having; a rotatable shaft with a gear secured to one end of said shaft, a driving gear rotated by said engine and in mesh with the gear attached to said shaft for continuously rotating said shaft, a hub for the distributor having a bore with a pair of spaced bearings in said bore for said shaft, the improvement comprising; an enlargement of the bore of said hub disposed intermediate said bearings, a plurality of annular friction discs stacked within said enlargement, means on said shaft for preventing rotation between alternate friction discs and said shaft, means on said hub for preventing rotation between the remainder of said discs and said hub, and spring means disposed within said enlargement in contact with at least one disc for applying a pressure between said discs and yieldably holding said shaft against rotation.

4. In a distributor for an internal combustion engine having; a hub, a rotatable shaft extending through a bore in said hub, a driving gear secured to said shaft in mesh with and adapted to be continuously driven by a gear driven by said engine, the improvement comprising; a sleeve concentrically disposed relative to said shaft and carried by said hub, a longitudinal ridge within said sleeve in axial alignment with said shaft, a longitudinally extending flat on said shaft axially aligned with said shaft and coextensively extending relative to said ridge, a plurality of annular shaped discs of friction material stacked one upon another within said sleeve, means on certain of said discs engageable with said ridge for preventing rotation between said certain discs and sleeve, means on the remainder of said discs engageable with said flat for preventing rotation between said remaining discs and shaft, and a spring within said sleeve for applying pressure on said stacked discs for imparting a drag against rotation on said shaft for preventing backlash between said gears.

5. In a distributor for an internal combustion engine the combination comprising; a hub, a shaft extending through a bore in said hub, a gear on the shaft arranged to be continuously driven by an engine driven gear a sleeve attached to said hub and concentrically spaced from and coaxially aligned with said shaft, an indentation in the outer surface of said sleeve providing a ridge on the sleeve's inner surface in alignment with the axis of said shaft, a flat longitudinally extending on said shaft to be coextensive with said ridge, a plurality of annular shaped discs of friction material stacked one upon another within said sleeve, means on certain of said discs engageable with said ridge for preventing rotation between said certain discs and sleeve, means on the remainder of said discs engageable with said flat for preventing rotation between said remaining discs and shaft, and a spring within said sleeve for applying pressure on said stacked discs for imposing a drag against rotation on said shaft for preventing backlash between said gears.

References Cited in the file of this patent

UNITED STATES PATENTS

| 1,598,839 | Wills | Sept. 7, 1926 |
| 1,828,425 | Matthews | Oct. 20, 1931 |
| 2,016,745 | Huthsing | Oct. 8, 1935 |

FOREIGN PATENTS

| 505,413 | France | May 6, 1920 |